United States Patent
Regan

(10) Patent No.: US 11,488,024 B1
(45) Date of Patent: Nov. 1, 2022

(54) METHODS AND SYSTEMS FOR IMPLEMENTING DEEP REINFORCEMENT MODULE NETWORKS FOR AUTONOMOUS SYSTEMS CONTROL

(71) Applicant: Ball Aerospace & Technologies Corp., Boulder, CO (US)

(72) Inventor: Daniel Regan, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 300 days.

(21) Appl. No.: 16/886,983

(22) Filed: May 29, 2020

Related U.S. Application Data

(60) Provisional application No. 62/853,918, filed on May 29, 2019.

(51) Int. Cl.
  *G06N 3/08* (2006.01)
  *G06N 3/04* (2006.01)
  *G06T 7/20* (2017.01)

(52) U.S. Cl.
  CPC .......... *G06N 3/088* (2013.01); *G06N 3/0454* (2013.01); *G06T 7/20* (2013.01); *G06T 2207/20081* (2013.01); *G06T 2207/20084* (2013.01)

(58) Field of Classification Search
  CPC ........ G06N 3/088; G06N 3/0454; G06T 7/20; G06T 2207/20081; G06T 2207/20084
  See application file for complete search history.

(56) References Cited

U.S. PATENT DOCUMENTS

| | | | |
|---|---|---|---|
| 5,588,073 A | 12/1996 | Lee et al. | |
| 5,636,326 A | 6/1997 | Stork et al. | |
| 5,719,794 A | 2/1998 | Altshuler et al. | |
| 5,960,391 A | 9/1999 | Tateishi et al. | |
| 6,075,991 A | 6/2000 | Raleigh et al. | |

(Continued)

FOREIGN PATENT DOCUMENTS

CN 108875595 11/2018

OTHER PUBLICATIONS

U.S. Appl. No. 16/597,411, filed Oct. 9, 2019, Schmidt et al.
(Continued)

*Primary Examiner* — Bobbak Safaipour
(74) *Attorney, Agent, or Firm* — Sheridan Ross, P.C.

(57) ABSTRACT

A novel architecture for a network of deep reinforcement modules that enables cross-functional and multi-system coordination of autonomous systems for self-optimization with a reduced computational footprint is disclosed. Each deep reinforcement module in the network is comprised of either a single artificial neural network or a deep reinforcement module sub-network. DReMs are designed independently, decoupling each requisite function. Each module of a deep reinforcement module network is trained independently through deep reinforcement learning. By separating the functions into deep reinforcement modules, reward functions can be designed for each individual function, further simplifying the development of a full suite of algorithms while also minimizing training time. Following training, the DReMs are integrated into the full deep reinforcement module network, which is then refined through additional reinforcement training or genetic multi-objective optimization to maximize the overall performance of the network.

20 Claims, 6 Drawing Sheets

(56) References Cited

U.S. PATENT DOCUMENTS

| | | | |
|---|---|---|---|
| 6,252,627 | B1 | 6/2001 | Frame et al. |
| 6,437,692 | B1 | 8/2002 | Petite et al. |
| 6,597,394 | B1 | 7/2003 | Duncan et al. |
| 6,820,053 | B1 | 11/2004 | Ruwisch |
| 7,020,501 | B1 | 3/2006 | Elliott et al. |
| 7,590,098 | B2 | 9/2009 | Ganesh |
| 8,019,544 | B2 | 9/2011 | Needelman et al. |
| 8,583,371 | B1 | 11/2013 | Goodzeit et al. |
| 8,929,936 | B2 | 1/2015 | Mody et al. |
| 9,073,648 | B2 | 7/2015 | Tsao et al. |
| 9,191,587 | B2 | 11/2015 | Wright et al. |
| 9,294,365 | B2 | 3/2016 | Misra et al. |
| 9,449,374 | B2 | 9/2016 | Nash et al. |
| 9,702,702 | B1 | 7/2017 | Lane et al. |
| 9,924,522 | B2 | 3/2018 | Gulati et al. |
| 9,927,510 | B2 | 3/2018 | Waldron et al. |
| 10,021,313 | B1 | 7/2018 | Chen et al. |
| 10,048,084 | B2 | 8/2018 | Laine et al. |
| 10,271,179 | B1 | 4/2019 | Shima |
| 10,726,830 | B1 | 7/2020 | Mandal et al. |
| 10,970,520 | B1 | 4/2021 | Kim et al. |
| 11,132,211 | B1* | 9/2021 | Tang ............... B60W 60/00 |
| 11,303,348 | B1* | 4/2022 | Staple ............... H04B 7/086 |
| 11,314,529 | B2* | 4/2022 | Suo ............... G06N 20/00 |
| 2005/0049876 | A1 | 3/2005 | Agranat |
| 2005/0228660 | A1 | 10/2005 | Schweng |
| 2006/0030332 | A1 | 2/2006 | Carrott et al. |
| 2007/0010956 | A1 | 1/2007 | Nerguizian et al. |
| 2008/0020354 | A1 | 1/2008 | Goree et al. |
| 2008/0045235 | A1 | 2/2008 | Kennedy et al. |
| 2008/0293353 | A1 | 11/2008 | Mody et al. |
| 2009/0179142 | A1 | 7/2009 | Duparre et al. |
| 2009/0197550 | A1 | 8/2009 | Huttunen et al. |
| 2009/0268619 | A1 | 10/2009 | Dain et al. |
| 2010/0091017 | A1 | 4/2010 | Kmiecik et al. |
| 2012/0071105 | A1 | 3/2012 | Walker et al. |
| 2012/0072986 | A1 | 3/2012 | Livsics et al. |
| 2012/0163355 | A1 | 6/2012 | Heo et al. |
| 2012/0167144 | A1 | 6/2012 | Avison-Fell |
| 2012/0202510 | A1 | 8/2012 | Singh |
| 2012/0238201 | A1 | 9/2012 | Du et al. |
| 2012/0238220 | A1 | 9/2012 | Du et al. |
| 2014/0218520 | A1 | 8/2014 | Teich et al. |
| 2014/0232871 | A1 | 8/2014 | Kriel et al. |
| 2014/0282783 | A1 | 9/2014 | Totten et al. |
| 2014/0329540 | A1 | 11/2014 | Duggan et al. |
| 2015/0009072 | A1 | 1/2015 | Nijsure |
| 2015/0100530 | A1* | 4/2015 | Mnih ............... A63F 13/67 706/25 |
| 2016/0101779 | A1 | 4/2016 | Katoh |
| 2016/0173241 | A1 | 6/2016 | Goodson et al. |
| 2016/0187477 | A1 | 6/2016 | Wang |
| 2017/0120906 | A1 | 5/2017 | Penilla et al. |
| 2017/0123429 | A1 | 5/2017 | Levinson et al. |
| 2017/0366264 | A1 | 12/2017 | Riesing et al. |
| 2018/0019910 | A1 | 1/2018 | Tsagkaris et al. |
| 2018/0025641 | A1 | 1/2018 | LaVelle et al. |
| 2018/0033449 | A1 | 2/2018 | Theverapperuma et al. |
| 2018/0053108 | A1 | 2/2018 | Olabiyi et al. |
| 2018/0082438 | A1 | 3/2018 | Simon et al. |
| 2018/0107215 | A1 | 4/2018 | Djuric et al. |
| 2018/0149730 | A1 | 5/2018 | Li et al. |
| 2018/0268571 | A1 | 9/2018 | Park et al. |
| 2018/0293893 | A1 | 10/2018 | Yang et al. |
| 2018/0324595 | A1 | 11/2018 | Shima |
| 2019/0042943 | A1* | 2/2019 | Dasgupta ............... G06N 3/084 |
| 2019/0049955 | A1 | 2/2019 | Yabuuchi et al. |
| 2019/0066713 | A1 | 2/2019 | Mesgarani et al. |
| 2019/0122689 | A1 | 4/2019 | Jain et al. |
| 2019/0164430 | A1 | 5/2019 | Nix |
| 2019/0213887 | A1 | 7/2019 | Kitayama et al. |
| 2019/0294108 | A1 | 9/2019 | Ozcan et al. |
| 2019/0318725 | A1 | 10/2019 | Le Roux et al. |
| 2019/0322282 | A1 | 10/2019 | Theodosis et al. |
| 2019/0353741 | A1 | 11/2019 | Bolster, Jr. et al. |
| 2019/0363430 | A1 | 11/2019 | Wang et al. |
| 2020/0104702 | A1* | 4/2020 | Zhang ............... G06N 3/0472 |
| 2020/0105381 | A1* | 4/2020 | Zhang ............... G06N 20/20 |
| 2020/0175364 | A1* | 6/2020 | Xu ............... G06N 3/04 |
| 2020/0327397 | A1 | 10/2020 | Govea et al. |
| 2020/0335121 | A1 | 10/2020 | Mosseri et al. |
| 2020/0380353 | A1* | 12/2020 | Ding ............... G06N 3/08 |
| 2021/0374538 | A1* | 12/2021 | Mnih ............... G06N 20/00 |
| 2022/0067290 | A1* | 3/2022 | Cougias ............... G06K 9/6256 |

OTHER PUBLICATIONS

U.S. Appl. No. 16/668,826, filed Oct. 30, 2019, Shima.
U.S. Appl. No. 16/693,992, filed Nov. 25, 2019, Tchilian.
U.S. Appl. No. 16/745,725, filed Jan. 17, 2020, Tchilian et al.
U.S. Appl. No. 16/806,367, filed Mar. 2, 2020, Frye et al.
"Deep Learning Meets DSP: OFDM Signal Detection," KickView Tech Blog, Feb. 13, 2018, 25 pages [retrieved online from: blog.kickview.com/deep-learning-meets-dsp-ofdm-signal-detection/].
Buchheim "Astronomical Discoveries You Can Make, Too!" Springer, 2015, pp. 442-443.
Goodfellow et al. "Deep Learning," MIT Press, 2016, 796 pages [retrieved online from: www.deeplearningbook.org].
Gu et al. "Continuous Deep Q-Learning with Model-based Acceleration," Proceedings of Machine Learning Research, vol. 48, 2016, pp. 2829-2838.
Happel et al. "The Design and Evolution of Modular Neural Network Architectures," Neural Networks, 1994, vol. 7, pp. 985-1004.
Johnson "Orbital Debris: The Growing Threat to Space Operations," 33rd Annual Guidance and Control Conference, Feb. 6, 2010, Breckenridge, CO, United States,.
Ma et al. "Attitude-correlated frames approach for a star sensor to improve attitude accuracy under highly dynamic conditions," Applied Optics, Sep. 2015, vol. 54, No. 25, pp. 7559-7566.
Ma et al. "Performance Analysis of the Attitude-correlated Frames Approach for Star Sensors," IEEE, 3rd IEEE International Workshop on Metrology for Aerospace (MetroAeroSpace), Firenze, Italy, Jun. 22-23, 2016, pp. 81-86.
Nair et al. "Accelerating Capsule Networks with Tensor Comprehensions," Princeton, May 2018, 8 pages.
Ni et al. "Attitude-correlated frames adding approach to improve signal-to-noise ratio of star image for star tracker," Optics Express, May 2019, vol. 27, No. 11, pp. 15548-15564.
Peng et al. "Improving Orbit Prediction Accuracy through Supervised Machine Learning,".
Taylor "Transfer Learning for Reinforcement Learning Domains: A Survey," Journal of Machine Learning Research, 2009, vol. 10, pp. 1633-1685.
Wang "Research on Pruning Convolutional Neural Network, Autoencoder and Capsule Network," before Oct. 9, 2018, 11 pages.
Wang et al. "An Optimization View on Dynamic Routing Between Capsules," ICLR 2018 Workshop, Feb. 2018, 4 pages.
Watkins "Learning from Delayed Rewards," King's College, May 1989, Thesis for Ph.D., 241 pages.

* cited by examiner

METHODS AND SYSTEMS FOR IMPLEMENTING DEEP REINFORCEMENT MODULE NETWORKS FOR AUTONOMOUS SYSTEMS CONTROL

CROSS-REFERENCE TO RELATED APPLICATIONS

This application claims the benefit of U.S. Provisional Patent Application Ser. No. 62/853,198, filed May 29, 2019, the entire disclosure of which is hereby incorporated herein by reference.

FIELD

The present disclosure is generally directed to artificial intelligence systems and more particularly toward training interconnected artificial intelligence systems.

BACKGROUND

Sensors are used throughout the modern world to collect data. Sensors collect a wide variety of information. For example, sensors may be acoustic sensors, electric current sensors, position sensors, angle sensors, displacement sensors, distance sensors, speed sensors, acceleration sensors, optical sensors, light sensors, heat sensors, proximity sensors, etc.

As the use of modern sensors systems expands around the world, through land, sea, air, and space, the collection of data from such sensors is a problem of increasing proportions. Efficiently analyzing the data collected from devices with sensors across a network of inter-connected devices must be achieved in order to control the devices collecting the data in order to achieve some goal. In this way, sensor systems may be tasked with accomplishing goals involving the collection of data and the direction of the devices collecting the data and/or other devices to efficiently accomplish a goal or task.

The optimal tasking of sensor systems is of the utmost importance, for example, in many military and intelligence domains. The sparseness of targets of interest within the massive environments of the four physical domains, i.e. land, sea, air, and space, presents a significant challenge for the tasking of sensor systems responsible for the monitoring and surveillance of these regimes. With relatively few systems, sensor coverage is thin, resulting in an overtasked sensor architecture overwhelmed by the fog of uncertainty. This challenge is answered with the construction of dense sensor populations; however, this often results in a network of underutilized resources and the added challenges of data congestion and data fusion. Any entity involved in managing sensor systems has an interest in tasking systems capable of addressing the optimal allocation of scarce resources and the data fusion of large-scale sensor networks. For this reason, the automation of sensor network tasking is a highly important area of research. Cross-system tasking and cross-domain intelligence demands highly-efficient and autonomous data-management and tasking systems.

Consider as an example the problem of space situational awareness ("SSA"). SSA is a mission area of growing complexity given the increasing number of satellites flown for military, commercial, and civil applications. The space environment is becoming congested and contested. Thus, there is a growing need for new and better systems to search, track, characterize, and catalog resident space objects. Automation of these sensors and functions is a necessary requirement to maximize the effectiveness of SSA; however, the development and maintenance of an optimized suite of autonomous algorithms to manage a ground- and space-based enterprise is incomparably complex and cost prohibitive. A potential answer to this problem is the development of self-optimizing, cooperative, autonomous systems that are inherently adaptable to an ever-changing mission environment.

SUMMARY OF THE INVENTION

Contemporary methods of using deep reinforcement architectures for decision making deeply entwine various functionalities within a single deep learning network. Such methods require substantial stochastic training and memorized experiences to teach network complex functions, increasing the risk for catastrophic forgetting. Conventional large networks, however, are computationally expensive and require significant memory resources. Such factors limit the practicality of deploying conventional large networks. Furthermore, development of traditional hard-coded tasking algorithms for individual systems with limited resource management capacity is expensive and optimization must be explicitly derived, applied, and updated, not simply learned. As such, what is needed is a new method. In the methods and systems described herein, functions are decomposed into functional modules referred to as deep reinforcement modules ("DReMs"). As described herein, DReMs can exist across physical elements, in such a way that a network of DReMs, or a DReM network, may be capable of controlling a system of systems. DReMs may be trained in isolation against individually designed reward functions and may then be connected and retrained as a full network. An integrated network can include communication channels between DReMs enabling the exchange of information combined with state information to form complex input or "inspiration." DReMs can be deployed and allowed to self-optimize or can be trained externally and updated.

Additional features and advantages of embodiments of the present disclosure will become more readily apparent from the following discussion, particularly when taken together with the accompanying drawings.

DETAILED DESCRIPTION

Figure 1:
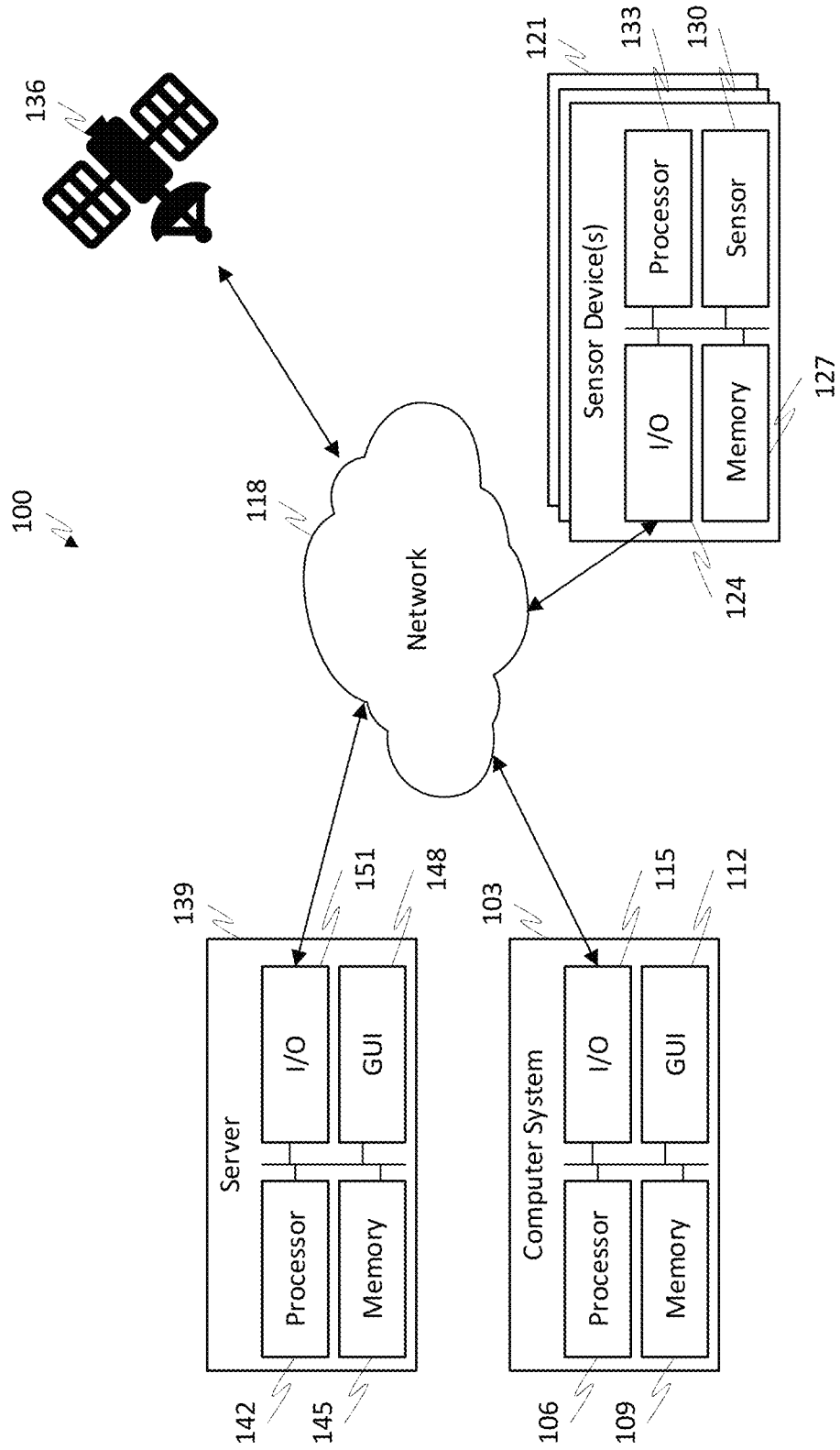
FIG. 1 depicts a network based system of computers and sensor devices in accordance with embodiments of the present disclosure.

The methods and systems described herein improve upon contemporary systems in that functions are decoupled from each other, which reduces the complexity of state- and action-space while preserving the overall capability of the integrated network. As described herein, the training of individual DReMs is simplified and refined as compared to conventional systems while enabling greater control over input information and the reward function. Furthermore, a network of DReMs may be integrated to connect pre-optimized DReMs to expedite full-network training against mission objectives.

Communication channels between DReMs as described herein allow for the selective re-coupling of functions for more holistic or cooperative decision-making, i.e. considering the benefit to other DReMs. The systems as described herein enable adaptable, self-optimizing algorithm networks that are mission-based rather than element-based.

The modularity of the systems described herein provides reconfigurability as compared with conventional systems without losing trained information within each deep reinforcement module ("DReM"). The systems and methods as described herein support the creation of fully autonomous systems by meeting real-time processing with real-time decision making.

As described herein, a novel deep neural architecture for the control of autonomous systems is achieved. Functional block architecture combines the power and capacity of deep learning systems with the engineering control of traditional algorithm sets. By decomposing mission level functions (e.g., SSA) into comparably simple DReMs, the complexity of a problem may be reduced by breaking it into smaller pieces of the engineer's design. In this way, the mysticism, or black-box nature, of deep learning may be reduced while maintaining the power of large, complex systems. As described herein, DReMs are artificial neural networks trained to perform explicitly identified functions.

In some embodiments, state information to be used as an input into each network and action output may explicitly be reduced to that which is required for each module's purpose. In this way, the overall decision-space for each DReM may be reduced. The design of reward functions for reinforcement training of each network may also be simplified as the function of each module is decoupled.

DReMs as described herein may individually be small and may be executed within one or more CPUs or GPUs onboard a sensor-carrying device. DReM networks may exist within a single system, span multiple physical systems, or in some embodiments may exist virtually within a cloud architecture.

Communication channels between DReMs allow for cooperation between functions or sensors within a DReM network for improved mission-level performance. State data may be concatenated with communication channel data to form a complex input or inspiration for a DReM. Communication channels can be used to inform one or more downstream DReMs of upstream decisions, or to enable cooperation between horizontal (i.e. "simultaneous") modules.

For DReM networks spanning multiple systems, DReM communications can be shared over local area network interfaces (e.g. Bluetooth, wired, wireless, etc.) or over long distances (such as ground-to-space, etc.). Integrated network training may be used to train DReMs to accommodate communication channel information without requiring a designer to explicitly define new reward functions for each module.

Network training may be accomplished by retraining all modules simultaneously both against their own reward functions and against a meta-reward objective function for the larger network. Training can be accomplished through a modified reinforcement learning technique, or genetic multi-objective optimization. As a result, a network of functional modules trained to select actions best for both themselves and the mission may be created.

The systems described herein can support the development of a fully-autonomous system of systems, capable of processing real-time data into decisions, such as the command and control of multiple sensors within a framework, e.g. a battlefield awareness framework.

As illustrated in FIG. 1, DReM networks may be implemented in an environment 100 comprising multiple computer elements in some embodiments. For example, a computer system 103 may be used to control, program, manage, and maintain one or more DReMs in of a DReM network. A computer system 103 may include a processor 106, memory elements 109, a GUI 112 for displaying information, and one or more input/output elements 115. The computer system 103 may be capable of communicating over a network 118 and may be in communication with one or more sensor devices 121. Sensor devices 121 may include, for example, input/output elements 124 for sharing data with connected computers and systems, memory elements 127, sensor elements 130, a processor 133, etc. Sensors 130 of a sensor device 121 may include, but are not limited to optical sensors, motion sensor, acoustical sensors, etc. In some embodiments, sensors used as part of a DReM network may be implemented on a satellite 136. The satellite 136 may be capable of being controlled, for example to capture particular data sets using onboard sensors. The satellite 136 may be in communication with other elements via the network 118. In some embodiments, a server device 139 may be used to execute one or more artificial neural networks or DReMs. A server 139 may include a processor 142, memory device 145, GUI 148, and/or input and output devices 151. As should be appreciated, each of the elements required by a DReM network may be implemented within a single device or within multiple devices either wired or wirelessly connected.

DReM networks can be composed of DReM modules or DReM sub-networks. For example, a top-level DReM network could be used to control two DReM sub-networks, where each sub-network is trained as described to optimize its own performance, while the larger DReM network is trained as a whole to maximize the coordination of the two sensors. Communication channels can exist between DReMs within each module, as well as from the top-level network down to facilitate cooperation.

In some embodiments, a plurality of DReMs may be interconnected by a number of communication channels. As described herein, a communication channel may be wired or wireless and may include any number of or combination of known communication systems. In some embodiments, communication channels may be one-direction or may enable bidirectional intercommunication between DReMs.

In some embodiments, a network of DReMs may have a data flow direction in which data may be passed from upstream DReMs from to downstream DReMs. Communication channels may be set up between the DReMs throughout the network to achieve the requisite data flow. For example, data output from a first DReM may be passed to one or more downstream DReMs. DReMs at a same level on the data flow stream may exchange data and data may from there be passed further downstream. Downstream DReMs may also be capable of receiving the same data accessible by upstream DReMs. For example, an upstream DReM may output unprocessed data to be used by downstream DReMs in later analysis.

Each DReM may be trained individually. For example, a single reward function and a specific set of training data may be used to train a first DReM while a different reward function and specific set of training data may be used to train a second DReM. In this way, the training of each DReM of a larger network of interconnected DReMs may be kept relatively simple.

A single DReM may further be made up of a plurality of artificial intelligence systems. Each AI system within a first DReM may further be trained individually using its own custom reward function before later being trained along with the other AI systems within the first DReM as the first DReM is trained using a reward function specific to that first DReM.

Groups of DReMs may be trained together. For example, a DReM sub-network may be created by grouping a number of connected DReMs. A DReM sub-network may then be trained on its own using a reward function specific to that sub-network.

As described herein, a novel architecture for modularized deep reinforcement neural networks that enables cross-functional and multi-system coordination of autonomous systems for self-optimization with a reduced computational footprint may be achieved. The modular architecture as described herein simplifies the development and optimization of multi-objective and/or multi-sensor systems by decomposing mission-level functions into individually trained DReMs. Each DReM in a network is comprised of either a single artificial neural network or a DReM sub-network. DReMs are designed independently, thereby decoupling each requisite function which simplifies the development of a complex algorithmic architecture into small chunks.

DReM functions can exist within a single computer system, across multiple devices, or even across multiple physical systems within a larger architecture. Each module of a DReM network is trained independently through deep reinforcement learning, i.e., a deep learning concept based on the Skinnerian theory of behaviorism that allows an artificial neural network to learn from experiences gained by interacting with an environment, for example a simulation.

The mapping of environment states to taken actions may be guided by a user-defined reward function. By separating the functions into DReMs, reward functions can be specifically designed for each individual function, further simplifying the development of a full suite of algorithms while also minimizing training time. Following training, DReMs may be integrated into a full DReM network, which may then be refined through additional reinforcement training or genetic multi-objective optimization to maximize the overall performance of the network.

The result of this architecture is a network of functions which are individually optimized for functional performance, and subsequently optimized as an integrated network against higher-level (e.g. mission- or enterprise-level) requirements. Because of the inter-connectivity of the DReM functions through communication channels, functions can be trained to consider the actions that not only benefit their own reward functions, but also the benefit their actions have on the reward functions of other DReMs within the network.

Figure 2:
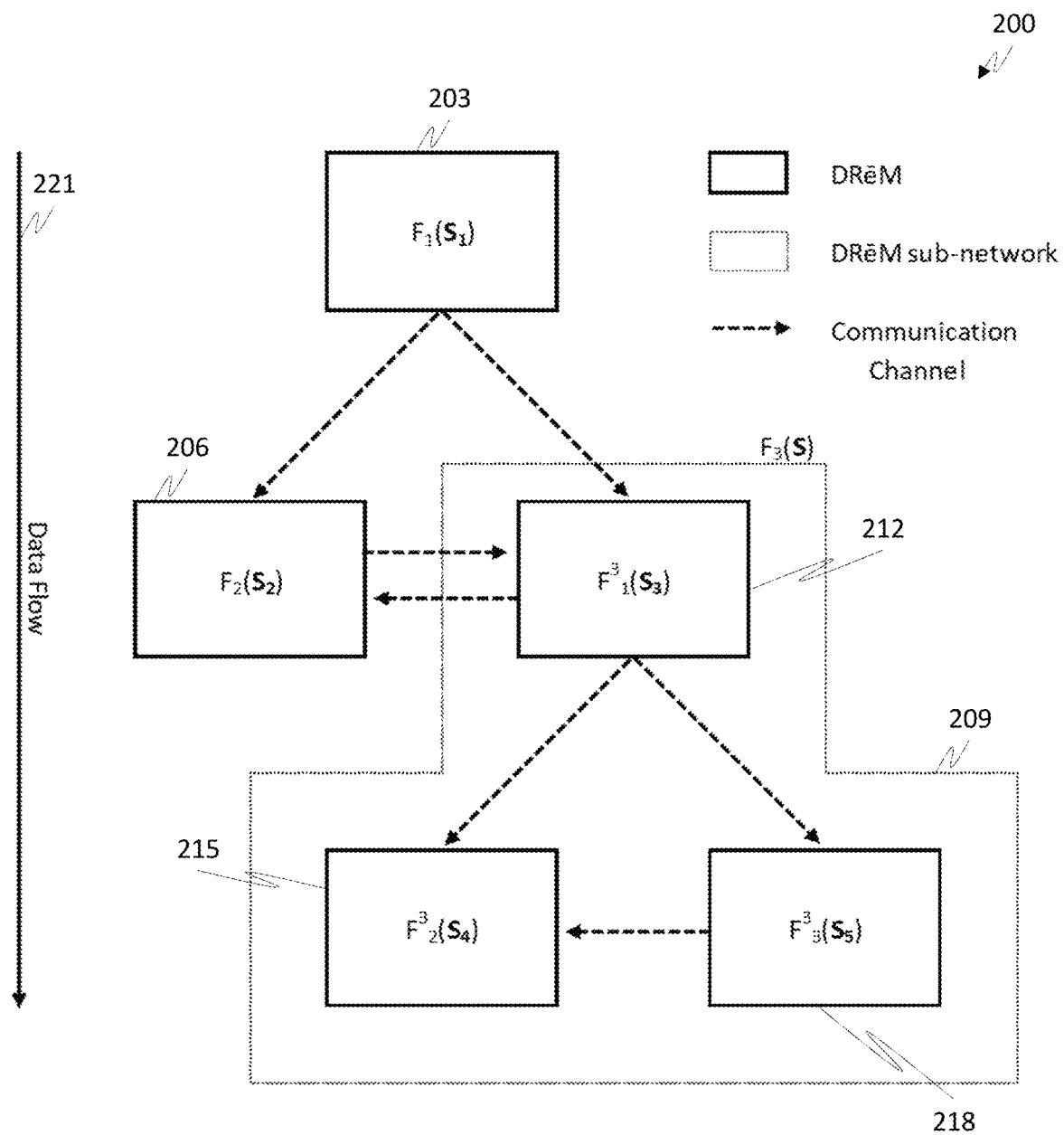
FIG. 2 depicts a block diagram of a network of deep reinforcement modules ("DReMs") in accordance with embodiments of the present disclosure.

In FIG. 2, an example DReM network 200 is illustrated. The DReM network 200 is made up of three primary DReMs, $F_1$ 203, $F_2$ 206, and $F_3$ 209, with $F_3$ 209 being a DReM sub-network comprised of sub-modules $F_1^3$ 212, $F_2^3$ 215, and $F_3^3$ 218. Each DReM may be expressed, for at least the purpose of illustration, as a function of some expression of state $S_i$, where $S_i \in S$, the complete state information of the system. The flow of data, or alternatively the order of execution, may be from top to bottom as illustrated by the arrow 221. Channels of communication between the DReMs are illustrated in the figure as dashed arrows. Communication channels that flow downward are one-way channels, as information flowing from one function or DReM is input into a subsequent function or DReM. Conversely, communication between horizontally positioned networks can be one- or two-way communication channels. It is the architecture of the individual DReMs and the casting of communications between networks into input channels that enables this framework.

In some embodiments, a DReM may comprise a convolutional neural network ("CNN"). A CNN may comprise some arrangement of two- and/or three-dimensional convolutional layers, activation layers, normalization and pooling layers, and an output network of fully-connected layers. A DReM comprising a CNN may be used for image processing and may progressively build up an understanding of information contained in an image from low-level contour detail, to small recognizable shapes, to image-scale content and spatial information. Information compiled by layers of a CNN of a DReM may then be interpreted by fully-connected layers of the CNN to generate an output based upon the content of an input image, whether it be a classification of an object contained in the image, a name to match a face of a person within the image, or some other semantic or metric description of the input image. This principle can be extended to other media besides imagery such as signal processing, natural language, and other non-image-based forms of information with great success.

In some embodiments, networks of DReMs may be specifically designed for Q-learning and may be described as deep Q networks ("DQNs"). DQNs may use convolutional layers to interpret a state from input data describing an environment. For example, a DQN may interpret a state of a simulation. Interpreted states may be used to assign values to actions represented as elements of an output vector from the DQN. Through the mapping of states to highest-value actions, a DQN can be said to learn a policy, or set of learned courses of action, given different states of the environment. This policy can be used to perform a function, (e.g., play a game of chess, control a bipedal robot's balance while walking, or select a target to inspect closer out of a wide-field-of-view (WFOV) image of multiple objects). However, with a more nuanced and multi-dimensional state or action information, greater depth of network, computational burden, and training time may be required. By decomposing complex decision-making functions into smaller, simpler functions, the requirements for greater depth of network, computational burden, and training time may be mitigated within the DQN architecture as each function may be performed by a separate DReM or DReM network.

Although a CNN can ingest data of any dimensionality, CNNs may typically be used to process data with one, two, or three dimensions. Three-dimensional data, such as a color image, can be said to have a size of w×h×d, where w is the width of the image, h is the height, and d is the depth of the image or number of channels. For a color image, the depth dimension, d, may be encoded as a red channel, blue channel, and a green channel. As data flows through the convolutional layers of a CNN, filters process the data of the previous layer across all three dimensions, so that the information stored in the input to the next network layer contains a mix of information from all of the input channels of the previous layer. DReM networks utilize this multidimensionality to not only interpret multi-dimensional input data, but to also fuse input data from multiple sources. Specifically, data sourced from one DReM can be input to one or more other DReMs through one or more communication channels of the input data for consideration by the network.

The inclusion of communication channels within such a modular architecture circumvents a key drawback of conventional modularity, i.e., the decoupling of decision making between the sub-routines of a larger framework. In terms of simplicity and computation reduction, modularity has significant advantages. However, by isolating individual functions, the ability of the system to make decisions based on a holistic regard for all component functions is impeded if not prevented altogether. To counteract this effect, communication channels between DReMs as described herein may be utilized to re-instantiate a degree of interaction between functions or systems within the greater architecture. During the initial, individual DReM reinforcement training these communication channels might be filled with constant or random data. During integrated network optimization, however, individual networks can be trained to incorporate this additional data to improve overall network performance through DReM interactions.

Consider again the SSA problem as described above. To simplify the functionality of an SSA system, the three primary functions may be considered as being (1) searching, e.g., observation of space with little to no a priori information for the discovery of new objects; (2) custody, e.g., the re-observation of previously discovered objects for catalog maintenance and/or surveillance; and (3) tasking, e.g., the decision to execute one or more of the search and custody functions at any specific time. By arranging these functions into a DReM network, a network architecture with a tasking DReM feeding one or more of the search and custody DReMs may be created as shown in FIG. 3.

Figures 3, 4:
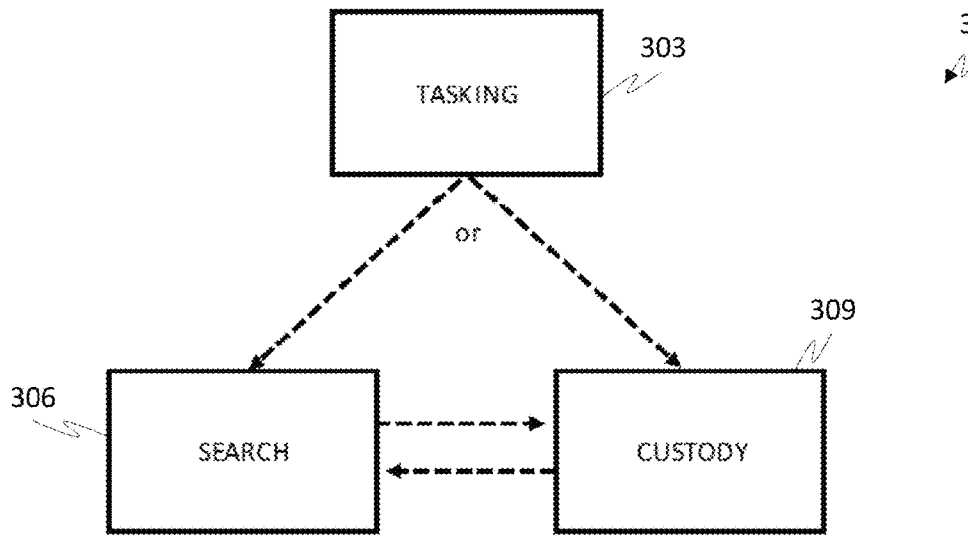
FIG. 3 depicts a block diagram of a network of DReMs in accordance with embodiments of the present disclosure.
FIG. 4 depicts heat maps of state information in accordance with embodiments of the present disclosure.

As illustrated in FIG. 3, a DReM network 300 may comprise a tasking DReM 303, a search DReM 306 and a custody DReM 309. Taking these networks out of order, the search DReM 306 may be designed to accept state information about a search region. For example, an input matrix might represent the environment in two spatial dimensions as the w and h dimensions with element values assigned based upon the age of search regions within the environment. Such an input matrix 403 may be as illustrated in FIG. 4, where the search region (and thus the non-zero elements) occupy only the middle two rows of the input matrix. A second input channel might encode the current state of the system as a position within the environment, such as a one-hot matrix 406 as illustrated in FIG. 4. Finally, regarding the DReM network diagram described above in relation to FIG. 3, there may be a two-way communication between the search DReM 306 and the custody DReM 309. There may therefore be a third input channel to the search DReM 306, representing the communication channel from the custody DReM to the search DReM, as represented initially as a zero matrix 409 illustrated in FIG. 4.

These state channels may then be concatenated along the third dimension and input as a single 10×10×3 state matrix. For a DQN framework, the output vector for the search DReM would then be a 1×20 vector, where each element represents the action of moving to each of the 20 search region locations identified in the first channel of the input matrix. Given some reward function $R(a|S_S)$ where a is the chosen action given the input search state matrix $S_S$, the search DReM can be trained through reinforcement to exhibit some quasi-optimal search policy. As the search DReM is initially trained on its own, the communication channel can be populated as a zero matrix.

To abbreviate this example, it may be assumed that the tasking and custody DReMs have been set up in a similar fashion as the search DReM. The state matrices for each network should contain subsets of state information pertinent to each function, and the custody DReM would include a communication channel relaying information from the search DReM. Each of these modules is then trained in isolation to learn to perform its respective function.

Integrated together, the DReM network follows a simple flow: given the state, the tasking DReM chooses either to execute the search function or the custody function. Selecting the search function, the search DReM will be executed. However, to populate the communication channel into the search DReM, the custody DReM is executed given the state information. Because the custody DReM also contains a communication channel, this channel may be zero-filled as the custody DReM is a secondary function in this situation. The output of the custody module may thereby represent a "suggestion" or "consideration" for the search DReM, and the output may be encoded into a conforming 10×10×1 matrix and appended to the two state channels of the search input. This input into a DReM, combining state information as well as communication information from another module, is referred to as a complex input, or an inspiration.

As discussed above, DReMs may be trained to consider only the state inputs to evaluate actions. When a DReM is trained to consider only the state inputs to evaluate actions, additional training may be required to refine functional policies incorporating communication channel information for cross-module consideration and/or cooperation. To accomplish this, the integrated DReM network may be trained as a whole for the refinement of individual DReMs such that the DReMs of the DReM network develop modified policies that benefit not only each DreM's individual functions, but the performance of the integrated network as a whole. One method for this is to set up a genetic multi-objective optimization loop, where the objectives are defined as the reward function of each DReM. In some embodiments an objective function may be applied for the performance of the full DReM network.

Beginning with random mutations of weight and bias variables within each CNN, generations may be bred from random parents. The fittest DReM networks, defined by those DReM networks which are most dominant against a particular objective functions, may be continued into the next generation. This process may be repeated until a stable, non-dominated Pareto front is discovered and an optimal DReM network can be selected.

The optimization of an integrated DReM network is a computationally expensive process, but is significantly shortened by the original, individual training of each DReM. DReM network optimization may in some embodiments be an application of transfer learning, or the tuning of a trained artificial neural network to a new or modified application. Transfer learning is a significantly faster process than initial training as it takes advantage of the information already encoded into the artificial neural network. For example filters embedded in the convolutional layers of the network may be used as part of the transfer learning process.

As this applies to the SSA example described above, the search DReM may be taught to consider the communication inputs from the custody DReM in its choice of action, and a search region location may be chosen not only based upon the merits of its benefit to search, but also based upon its immediate or future benefit to the custody function. Ultimately, this results in a suite of SSA algorithms that are considerate in their execution of a holistic, rather than disjointed, mission policy.

DReM networks need not be limited to the scope of a single system. DReMs can span multiple physical devices and several DReM networks can be integrated into a single, larger DReM network. Cross-system communication through local area networks, peer-to-peer networks, across the internet, or through specialized RF communication methods can enable communication channels between DReMs on different sensors, for example. The power of the DReM network lies not only in its adaptability, e.g., its ability to be trained against various reward functions, but also in its scalability.

Returning once more to the SSA example, consider two sensors, each employing a DReM network 300 as illustrated in FIG. 3, connecting the tasking DReMs 303 of each network with a two-way communication channel. Each sensor network can be trained individually as described for the optimization of individual performance. The two networks can then be integrated and retrained as a system of systems. Each sensor's tasking block may consider the position and tasking of the other sensor when tasking itself, allowing for cross-system optimization. This can be done either in a hierarchical manner where one sensor decides first and the second sensor decides based upon the tasking of the first, or in a peer arrangement which might be implemented where each network considers first its own state without communication. The results of this step may be communicated for re-decision based upon the other sensor's outputs.

Regardless of the implementation or application, DReM networks offer a unique advantage over single-network reinforcement architectures and traditional, hard-coded algorithms.

Figure 5:
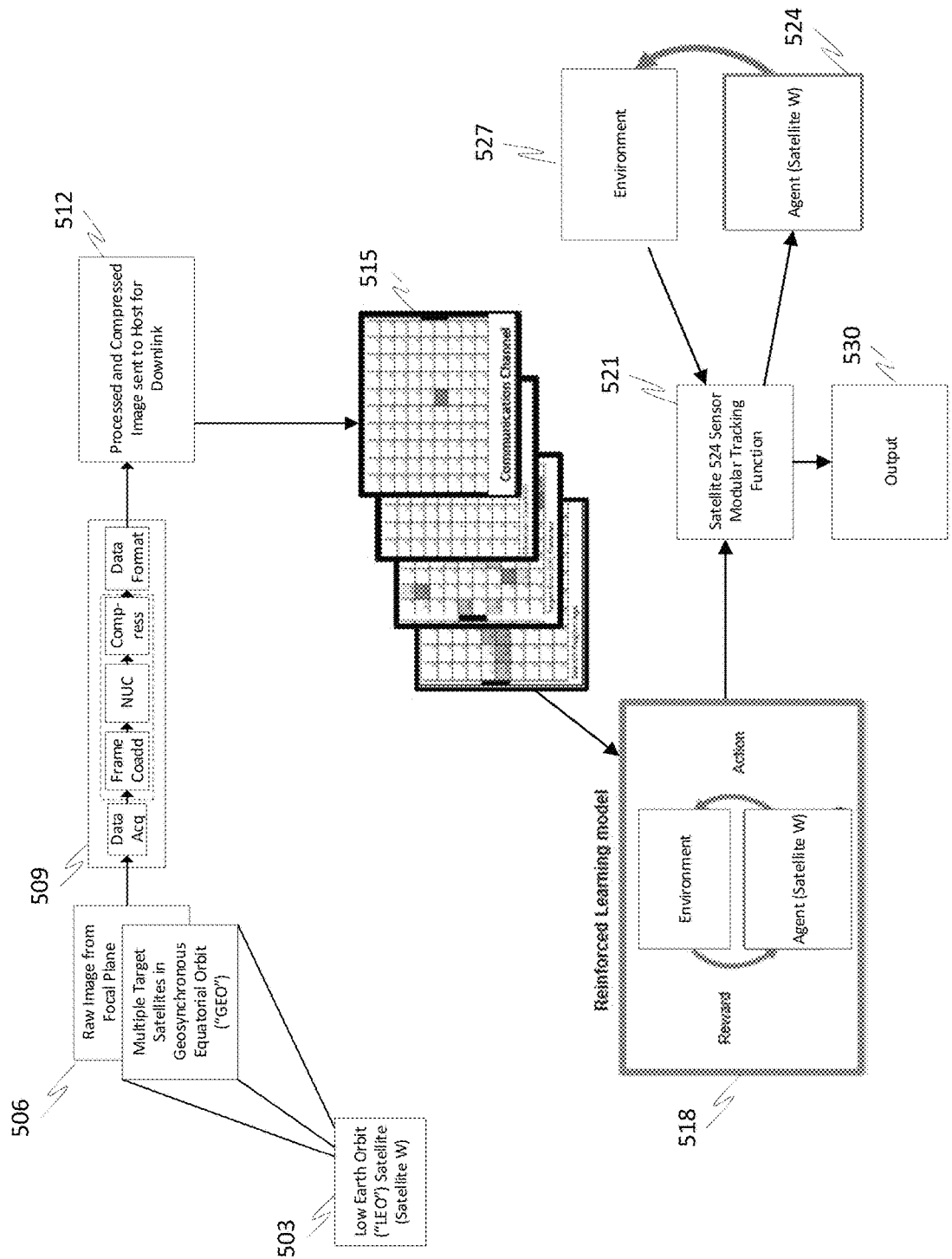
FIG. 5 depicts a modular, optimized mission-based artificial intelligence-enabled architecture for autonomous operation of satellites in accordance with embodiments of the present disclosure.

As illustrated in FIG. 5, a modular, optimized mission-based artificial intelligence-enabled architecture 500 may be achieved implementing a sensor modular function for searching in an SSA situation. A search function may consist of data collected using a low-earth orbit satellite 503. The satellite 503 may use its sensor in one orbit to search its field of view and catalog data (e.g., satellite x, y coordinate locations, brightness, etc.) on multiple satellite targets in another orbit (e.g., geostationary earth orbit). Such data may be recorded as one or more raw images 506 from the focal plane. In some embodiments, a reconfigurable focal plane electronic system 509 may be used to acquire the data, process the data, and format the data to achieve a processed and compressed image 512.

Using the reconfigurable focal plane electronic system 509, multiple satellite data sets collected by the satellite may be processed to remove noise and other defects. The output of the reconfigurable focal plane electronic system 509 may be a cleaned-up, processed data (e.g. location and brightness) of multiple satellite targets in the search field of view.

The image 512 may then be sent to a host device, such as a computer system as illustrated in FIG. 1. Next, one or more heat maps 515 may be generated from the image 512. Using a reinforced learning model 518, a processor may process different searching actions that the satellite takes and the level of reward (zero to one) for each action. The action-reward combination for each action may be stored in memory and an optimized course of actions for the search function may be predicted.

A second satellite 524 may be used for tracking the targets searched by the low earth orbit satellite 503. A satellite 524 sensor modular tracking function 521 may be optimized and used to control the tracking behavior of the satellite 524 as it tracks objects throughout its environment 527. The action of a tracking function used in the control of the satellite 524 may be determined by using a communication channel to receive the optimized course of actions for the search function. The reward for the search function may be given by $R_b$=f(Search Function, Tracking Function). In this way, the action that the tracking function decides to take considers the action not only of its own best interest, but in the best interest of other functions as well (e.g., the search function and the overall SSA system).

An output 530 of the system may be an optimized course of action for the tracking function based on the best reward for a particular action (e.g., tracking the trajectory of targets a, b, and c, to ensure that they do not collide).

Figure 6:
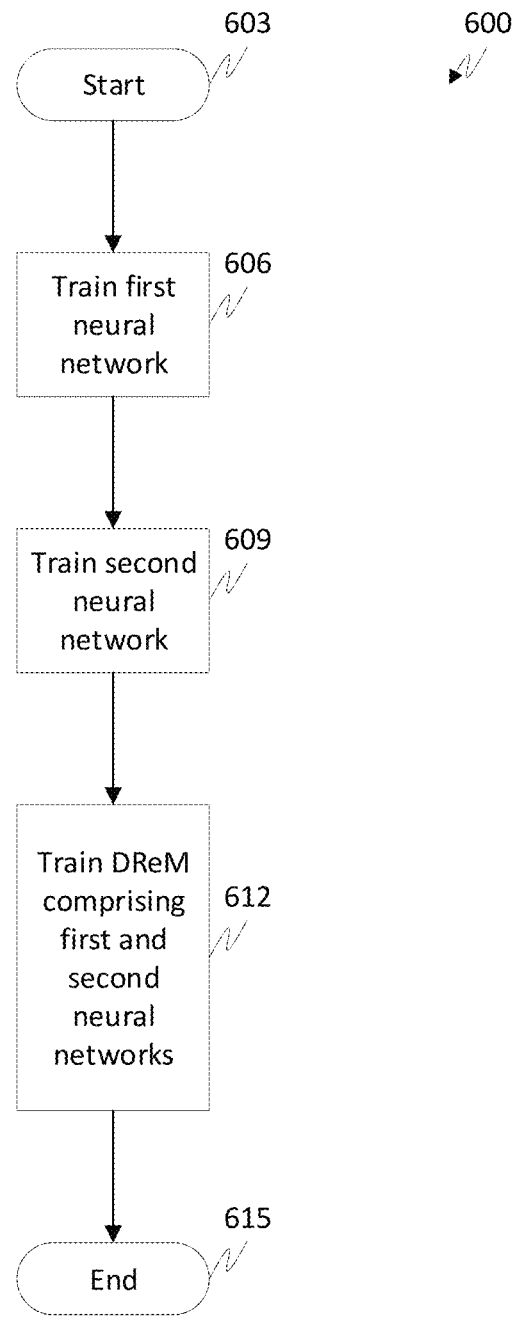
FIG. 6 depicts a flowchart of a method in accordance with embodiments of the present disclosure.

As illustrated in FIG. 6, a method 600 of implementing a DReM network framework may be implemented. Such a method 600 may begin at step 603 in which a network similar to that illustrated in FIG. 1 may be used to communicatively link one or more satellites, sensor devices, and/or computer systems. In step 606, a first neural network may be trained based on a first reward function. For example, a reward function specific to the task of the first neural network, ignoring any potential specific tasks of the overall network as a whole, may be used. In this way, the training of the first neural network may be kept to a relatively simple process capable of being performed by a computer system.

Next, in step 609, a second neural network may be trained. Again, the second neural network may be trained with its own specific reward function to keep the process relatively simple.

Finally, the first and second neural networks may be trained together as a DReM in step 612. By first training the individual neural networks before training the overall network, the processing requirements for the training may be greatly reduced. The method 600 may end at step 615 in which a fully trained neural network comprising multiple neural networks is achieved.

DReMs may be considered decision-making structures which can be interfaced with additional DReMs, modules created with other deep learning paradigms, traditional hard-coded algorithmic functions, and/or human-interface devices. The core function of a DReM may be to learn optimal functionality through interaction with a real or simulated environment. In the case of an SSA application, for example, two steerable, optical telescopes connected either physically or wirelessly to a central computer may be used. Each telescope may contain an onboard processor which has been programmed to process and exploit image data from the sensor, specifically the detection of orbital objects in the captured images and basic orbital determination algorithms to further process the captured data. The control of the telescopes and the collection of the collected images and data may then be handled by the central computer, which aggregates the data from each sensor and generates the next commands to steer the telescopes.

As a decision-making process, the central computer may for example employ three DReM networks. The first two may be functional in nature—one commanding the telescopes with the express goal of detecting new orbital objects (those that have not been previously detected), with the other commanding the telescopes to detect objects already catalogued for the purpose of statistical measurement error reduction/orbital determination solution convergence. At any given time, one or both telescopes may be commanded by either function. The third DReM may be designed to select which of the two functions will be executed on each telescope, and to feed input data into those functions based on previously collected images.

Defining optimization as the ideal management of these two telescopes to maximize the number of detected objects and to minimize the error of the catalogued orbital estimates, the optimization of this assembly is dependent upon the simultaneous optimization of each individual function as well as the system management as a whole. DReM networks are trained through individual and then integrated unsupervised learning. Being reinforcement-based, the modules are designed to interact with a mission-relevant environment (real or simulated) in order to map input data, in this case previous imagery and/or inputs from a commanding DReM module, to actions. Training is the derivation of ideal behavior based upon feedback from a reward function, i.e., a designed expression of consequences in response to decisions of a module.

In individual training, two functional modules may be trained through reinforcement to execute the functions of new object detection or catalogued object reacquisition optimally based on given individual reward functions. A commanding DReM may similarly be trained to select among these two functions for each telescope, as well as to generate input data for each function with a reward function that rewards an optimal balance between detection of new objects and management of catalog error.

Following individual training, the three modules are integrated and retrained as a whole against a new or modified reward function combining elements from all three individual reward functions. It is at this point that the communication channels novel to DReM networks are utilized as a means to transmit data from the commanding DReM to the two functional modules. The data contained in these channels is intended to present each functional module with additional information about the state of the system, which, through the integrated training, would be used to modify the independent "optimization" of each module to a holistic optimization which incorporates rewards based upon the intentions of the other modules in the integrated DReM network.

A fully trained DReM based SSA system would make real time decisions based upon its collected imagery to balance the intentions of all of its mission functions to some holistic optimized performance goal, maximizing the detection of new objects while also minimizing the total error of the orbital estimates of all catalogued objects. In this way, the DReM network framework is used to balance overlapping and/or competing mission needs to benefit the overall mission.

Figure 7:
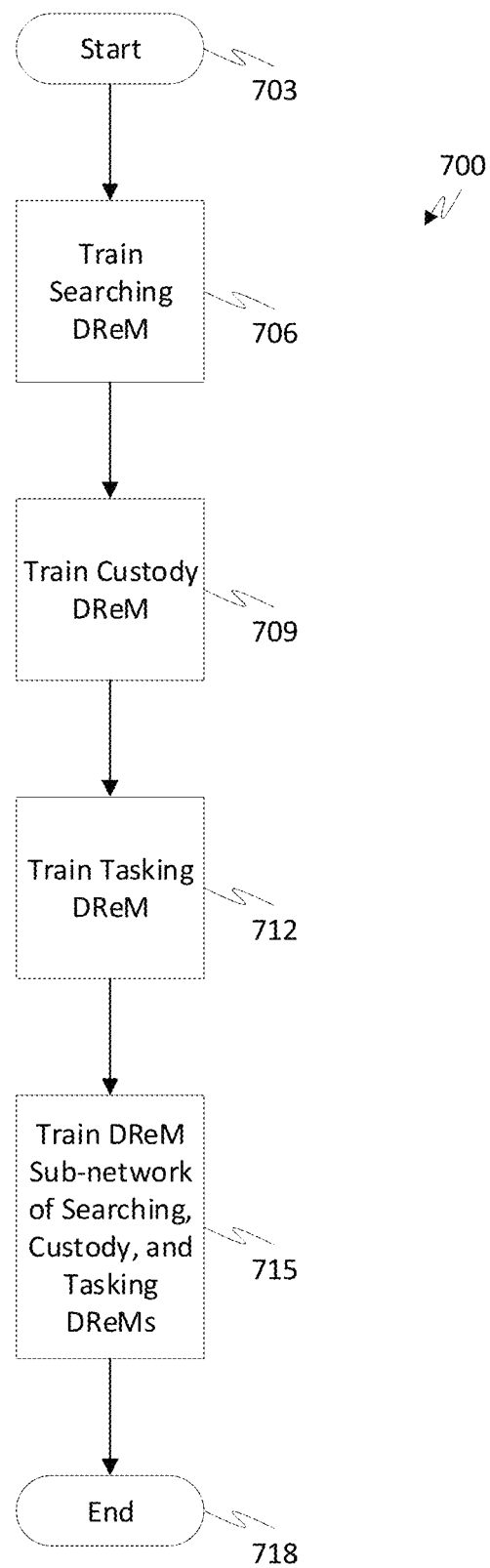
FIG. 7 depicts a flowchart of a method in accordance with embodiments of the present disclosure.

As illustrated in FIG. 7, a method 700 of implementing a complex DReM network framework capable of searching for items in space with a first satellite, executing a custody algorithm with a second satellite, and making the overall process of searching and custody of items efficient with a strong tasking neural network may be implemented. Such a method 700 may begin at step 703 in which a network similar to that illustrated in FIG. 1 may be used to communicatively link one or more satellites, sensor devices, and/or computer systems. In step 706, a first neural network designed to search for items may be trained based on a first reward function. For example, a reward function specific to the task of the first neural network, ignoring any potential specific tasks of the overall network as a whole, may be used. In this way, the training of the first neural network may be kept to a relatively simple process capable of being performed by a computer system. Each of the searching, custody, and tasking DReMs may be either a simple neural network or a group of inter-connected neural networks operating as a single DReM sub-system. Next, in step 709, a custody DReM may be trained. Again, the custody DReM may be trained with its own specific reward function to keep the process relatively simple. In step 712, the tasking DReM may next be trained. By training each of these separate DReMs separately, the overall processing requirements for the training may be greatly reduced for the system as a whole.

Finally, each of the searching, custody, and tasking DReMs may be trained together as a single neural network system in step 715. The method 700 may end at step 718 in which a fully trained neural network comprising multiple neural networks is achieved.

The foregoing discussion of the disclosed systems and methods has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A computer-implemented method of training a network of neural networks, the method comprising:
   training a first neural network based on a first reward function;
   training a second neural network based on a second reward function;
   training a first deep reinforcement module based on a third reward function, wherein the first deep reinforcement module comprises the first and second neural networks; and
   training a second deep reinforcement module based on a fourth reward function, wherein the second deep reinforcement module comprises the first deep reinforcement module and a third neural network.

2. The method of claim 1, wherein the first neural network executes on a first processor and the second neural network executes on a second processor.

3. The method of claim 1, wherein the third neural network is trained based on a fifth reward function.

4. The method of claim 1, wherein the first and second deep reinforcement modules are connected via a communication network.

5. The method of claim 1, wherein the first neural network is trained to search for items in visual sensor data.

6. The method of claim 5, wherein the second neural network is trained to track an item in space.

7. The method of claim 6, wherein the first deep reinforcement module is trained to track one or more items found by the first neural network.

8. A system comprising:
   a processor; and
   a computer-readable medium storing computer-readable instructions, which when executed by the processor, cause the processor to perform:
      training a first neural network based on a first reward function;

training a second neural network based on a second reward function;

training a first deep reinforcement module based on a third reward function, wherein the first deep reinforcement module comprises the first and second neural networks; and training a second deep reinforcement module based on a fourth reward function, wherein the second deep reinforcement module comprises the first deep reinforcement module and a third neural network.

9. The system of claim 8, wherein the first neural network executes on a first processor and the second neural network executes on a second processor.

10. The system of claim 8, wherein the third neural network is trained based on a fifth reward function.

11. The system of claim 8, wherein the first and second deep reinforcement modules are connected via a communication network.

12. The system of claim 8, wherein the first neural network is trained to search for items in visual sensor data.

13. The system of claim 12, wherein the second neural network is trained to track an item in space.

14. The system of claim 13, wherein the first deep reinforcement module is trained to track one or more items found by the first neural network.

15. A computer program product, comprising:

a non-transitory computer readable storage medium having computer readable program code embodied therewith, the computer readable program code configured when executed by a processor to:

train a first neural network based on a first reward function;

train a second neural network based on a second reward function;

train a first deep reinforcement module based on a third reward function, wherein the first deep reinforcement module comprises the first and second neural networks; and training a second deep reinforcement module based on a fourth reward function, wherein the second deep reinforcement module comprises the first deep reinforcement module and a third neural network.

16. The computer program product of claim 15, wherein the first neural network is trained to search for items in visual sensor data.

17. The computer program product of claim 16, wherein the second neural network is trained to track an item in space and the first deep reinforcement module is trained to track one or more items found by the first neural network.

18. The computer program product of claim 15, wherein the first neural network executes on a first processor and the second neural network executes on a second processor.

19. The computer program product of claim 15, wherein the third neural network is trained based on a fifth reward function.

20. The computer program product of claim 15, wherein the first and second deep reinforcement modules are connected via a communication network.

\* \* \* \* \*